UNITED STATES PATENT OFFICE 2,641,576

PHOTOPOLYMERIZATION PROCESS AND COMPOSITIONS

Carrol C. Sachs, North Hollywood, and John Bond, Los Angeles, Calif., assignors to Alexander H. Kerr and Company, Incorporated, Los Angeles, Calif., a corporation of Nevada No Drawing. Application November 6, 1948, Serial No. 58,814

11 Claims. (Cl. 204—158)

The photochemical polymerization of ethylenically unsaturated monomers and low molecular weight polymers of such unsaturated monomers has been described in the prior art.

This invention relates to the discovery that halogenated mono ketaldonyl compounds are highly efficient photopolymerization catalysts for the ethylenically unsaturated resinophors.

It is generally well known that certain of the organic resinophoric compounds are light-sensitive in that light reduces the induction period or increases the rate of polymerization. Such compounds are those resinophoric compounds which contain radicals which include an ethylene linkage and which polymerize according to the vinyl type of polymerization. Such compounds have been classed as vinyl types (see Plastics, Resins and Rubber, by Paul O. Powers, Chemical and Engineering News, October 25, 1946, vol 24, No. 200, page 2784).

These include the acrylic resins, i. e., resins produced by polymerization of acrylic acid or derivatives of acrylic acid, for example, methyl acrylic acid, or methyl, ethyl, butyl acrylate, methyl methacrylate, ethyl methacrylate, butyl methacrylate, isobutyl methacrylate. Such types also include styrene and its derivatives, for example, styrene and the alkyl nuclear substituted styrenes, such as ortho or metamethyl styrene or the chlorinated styrenes. It also includes chloroprene. This type also includes the allyl compounds, such as allyl alcohol and allyl alcohol condensed with poly basic acids, as in allyl maleate or allyl phthalate or the condensate of allyl alcohol with poly basic acids and polyhydric alcohols to form suitable copolymers.

Such types also include vinyl acetate, vinyl halides, for example, vinyl chloride and vinylidene halides, for example, vinylidene chloride.

The addition of a small amount of the photopolymerization catalyst of our invention to the photopolymerizable monomers or partial polymers positively catalyzes the photopolymerization materially.

These catalysts are also active for mixed monomers or mixed partial polymers or for the polymerization of mixed monomers or mixed partial polymers capable of copolymerization. Our catalysts catalyze the photopolymerization of copolymers of esters of unsaturated glycols such as ethene or butene diols and unsaturated dicarboxylic acids, such as maleic, fumeric or itaconic acid, or copolymers thereof with the above vinyl type of resinophoric compounds, as, for example, vinyl acetate or styrene.

Thus, these catalysts are active in the photopolymerization of the allyl esters and particularly the allyl esters of the polycarboxylic acid, such as diallyl maleate or diallyl phthalate and their copolymers with the above vinyl type resinophors.

Polyglycol esters of acrylic and methacrylic esters and their copolymers with the resinophors of the vinyl type as stated above are also included.

Cross linking agents may be employed which contain two or more terminal ethylene linkages ($CH_2=C<$) which may enter into a vinyl type of polymerization. These include ethylene dimethacrylate; allyl methacrylate; methallyl methacrylate; ethylene glycol dimethacrylate; hexamethylene glycol dimethacrylate; dimethallyl carbonate; and similar compounds.

All of the above resinophoric compounds contain $>C=C<$ (ethylenic) linkages in resinophoric arrangement. As stated above, certain of them are of the vinyl type and others, particularly certain of the ester types, are not all strictly classifiable as vinyl type polymers, in that their polymerization is not strictly of the vinyl type, since cross linkage to form three-dimensional resins is also possible. These may be classed as the non-vinyl ester type resinophors. They are all classifiable as ethylenically unsaturated resinophors and since, especially when catalyzed by our catalysts, they are photochemically polymerizable, they may thus be classed as ethylenically unsaturated photochemically polymerizable resinophoric compounds.

We have discovered that the mono ketaldonyls are photopolymerization catalysts if the carbon to the mono ketaldonyl group is joined to a halogen, such as chlorine, bromine or iodine. By mono ketaldonyl I refer to compounds having the following group:

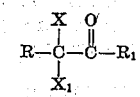

where R is selected from the group consisting of halogen atoms and monovalent hydrocarbon groups consisting solely of hydrogen and carbon atoms, X is a halogen atom, $X_1$ is selected from the group consisting of halogen atoms and hydrogen atoms, and $R_1$ is selected from the group consisting of hydrogen atoms and monovalent hydrocarbon groups consisting solely of hydrogen and carbon atoms.

Examples of the mono ketaldonyl photochemical catalyst of our invention are the halogenated compounds such as desyl halides, for example, desyl chloride and bromide, and halogenated aldehydes such as beta dichlor propionaldehyde or alpha beta di-brompropionaldehyde, chloral, and bromal. These examples are given only by way of example to illustrate the generic invention of the suitability of the halogenated ketaldonyls as described above and the specific utility of the chlorinated aldehydes and the chlorinated ketonic compounds stated generically and specifically above.

We may incorporate a small amount of the catalyst up to about 5% of the weight of the monomer or partial polymer to which it is added. It is possible to add too much of the catalyst and thus impair its activity. The amount will vary with the resinophor and the catalyst and the simple tests explained below will permit of the choosing of the optimum concentration of catalyst.

EXAMPLE 1

The comparative value of the chlorinated mono ketaldonyl to the corresponding hydroxylated compound is shown by the comparative activity of chloral and chloral hydrate.

A one per cent solution of chloral hydrate was made in methyl methacrylate monomer. A like per cent solution of chloral was made in methyl methacrylate which was rigorously dried by shaking with a desiccant. Each of the solutions was poured into like Pyrex vials of equal height and diameter and filled to a like level and exposed side by side to sunlight. Periodically, samples were simultaneously withdrawn from each of the flasks and analyzed by dissolving the samples in methanol. The precipitated polymer was dried and weighed.

Table 1

| Elapsed Time, Minutes | Percent Polymer Chloral | Percent Polymer Chloral Hydrate |
|---|---|---|
| 70 | 5.1 | No polymer. |
| 89 | 8.05 | Trace. |
| 110 | 11.15 | .05. |
| 145 | 15.75 | 1.20. |
| 180 | 26.5 | 3.3. |
| 210 | gelled | 4.36. |
| 270 | | 6.31. |
| 300 | | 9.16. |
| 335 | | 12.6. |
| 400 | | 30.0. |

A blank sample also exposed in the same manner gave no perceptible polymerization.

The above experiment shows the activity of the chloral. It will be observed that the chloral is much more active than the chloral hydrate. In other words, the aldehyde group was more active than the alcohol group.

EXAMPLE 2

This example illustrates the activity of the desyl halide species of our photopolymerization catalysts.

One per cent solution in methyl methacrylate of desyl chloride and uncatalyzed methyl methacrylate was placed in a Pyrex vial and exposed to sunlight. Samples were taken at different times from the vial. These samples were dissolved in methanol and the precipitated polymer filtered, dried, and weighed. The following table gives the per cent by weight of the precipitated polymer.

Table 2

| Elapsed Time of Exposure, Minutes | Percent precipitated polymer |
|---|---|
| 30 | 8.40 |
| 40 | 12.96 |
| 55 | 18.67 |
| 65 | 20.00 |
| 80 | 27.40 |
| 95 | 46.00 |

The uncatalyzed monomer showed no perceptible polymerization.

EXAMPLE 3

In this example the relative activity of the various members of the series is given and compared with the activity of the unhalogenated analogue thereof. One per cent of each of the compounds listed in the table was dissolved in methyl methacrylate and the control with nothing added to the monomer was placed in similar Pyrex vials and exposed side by side to the sun. Samples were taken from each vial and the per cent polymer determined in the manner stated in Examples 1 and 2. The results are tabulated below:

| Compound | Percent Polymer after— | | | | |
|---|---|---|---|---|---|
| | 15 min. | 30 min. | 48 min. | 60 min. | 120 min. |
| 1. Chloral | | | | 2.25 | 7.90 |
| 2. Bromal | 4.5 | 9.3 | 14.1 | no reading | |
| 3. Desyl chloride | 6.75 | 14.1 | 22.6 | do | |
| 4. Desyl bromide | 8.85 | 17.6 | 32.7 | do | |
| 5. Desoxybenzoin | 0 | 0 | 0 | 0 | .3 |
| 6. Control | 0 | 0 | 0 | 0 | 0 |

"0" indicates no polymer precipitate.

It will be observed that the halogenated compound is more active than its analogue. Compare desylchloride ($C_6H_5COCHClC_6H_5$) and desyl bromide ($C_6H_5COCHBrC_6H_5$) with desoxybenzoin ($C_6H_5COCH_2C_6H_5$). The brom compound appears more active than the corresponding chloride. Compare chloral with bromal and desyl chloride with desyl bromide.

The effect of concentration on activity is illustrated by the following example:

EXAMPLE 4

The resin employed was a mixture of monomeric styrene and a polymer of maleic anhydride and a polyethylene glycol. The following resin mixtures containing the tabulated per cent desyl chloride were exposed to sunlight side by side with the following results:

| Percent Catalyst | State of Resin after— | | |
|---|---|---|---|
| | 10 min. | 20 min. | 225 min. |
| 4 | soft gel | stiff gel | cured. |
| 2 | do | do | Do. |
| 1 | do | do | Do. |
| 0.5 | do | gel | Do. |
| 0.25 | surface gel | soft gel | Do. |
| 0.125 | no results | do | soft cured. |

Similar results are obtainable when using the other resinophors referred to.

The previous examples indicate the utility of the photopolymerization catalysts of our invention in the photopolymerization of monomers and partial polymers according to the so-called bulk method. In such methods the catalyst in the desired percentage is dissolved monomers or partially bulked or polymerized monomers of sufficiently low viscosity to permit of the incorporation of the catalyst. The resinophoric compound containing the catalyst may be polymerized photochemically by exposing the same to a source of ultra-violet or visible light. Temperature control to prevent excessive generation of heat during polymerization is desirable. The illumination may be by a light source positioned above the exposed surface of the container or where the container is light-transmitting, as when it is of glass, it may be made from a light source through the glass vessel. There are now available ultra-violet light sources which may be suspended inside the reaction vessel and these may be conveniently used.

The vessel may be of the desired shape to form a mold to give a molded casting of desired shape. Photochemical laminations may also be made as when the sheets being laminated are light-transmitting as, for example, if they be made of fibre glass, glass sheets, or plastic mesh or plastic sheets. In such cases the laminate, especially when the resin employed is of the contact type, may be formed into the desired laminate of the desired shape and set by photochemical means, as by exposing the laminate to sunlight or to a special source of illumination as indicated above.

The casting of the laminate may be further baked if further hardening or polymerization of the photopolymerized product is desired.

The photopolymerization process may be carried out at low or at elevated temperatures but as the temperatures become high, bubbles and striations may be formed in the castings. Since the catalyzed photopolymerization permits of rapid polymerization at low temperatures to produce bubble free castings, it is usually preferable to cause the reaction to occur at ordinary atmospheric temperatures and, if desired, even at low temperatures, i. e., at temperatures ranging from 5 to 50° C. These temperature limits are not critical and merely indicate that heat is not necessary to cause the reaction to proceed.

However, since thermal polymerization is not inhibited by these catalysts and may also be carried out simultaneously, elevated temperatures are not a hindrance so long as they are not so high as to cause bubbles or other defects, as will be recognized by those skilled in the art.

Photopolymerization employing our catalyst may also be carried out in a solution of the monomer or partial polymer in a volatile solvent. Thus, the monomer or partial polymer containing the catalyst is dissolved in a solvent and introduced into a vessel and illuminated. Usual precautions against the loss of solvent and cooling, where necessary to avoid overheating, may be employed. The solution is illuminated in a manner similar to that described above for bulk polymerization. Instead of polymerizing a bulk quantity solution in a vessel, we may saturate a sheet or a plurality of sheets arranged in laminated form with such solution and photopolymerize in a manner similar to that described above. The solvent may be evaporated either during, prior to, or subsequent to the photopolymerization.

We may, if desired, add conventional thermal polymerization catalysts, such as the peroxide catalysts like benzoyl, lauroyl, tertiary butyl hydrogen peroxide in addition to the photopolymerization catalyst. Thus, photopolymerization may be carried on either at low or at elevated temperatures and the photopolymerized gel may be hardened further by heating the photochemically gelled product. This permits of a relatively low temperature setting of the resin to pre-bodied form or to a relatively hard casting which may then be baked at an elevated temperature.

This is equally true when laminating. Thus, the laminate may be set at relatively low temperature by photopolymerization and the laminating bond hardened by baking.

By this process not only is the clearness and the integrity of the hardened gell increased, but the photopolymerization step accelerates the total time of cure.

The rate of photopolymerization may also be increased by suitable concentrations of the catalyst as indicated above.

When oxygen is found to deleteriously affect the rate of polymerization, vessels containing the material undergoing photopolymerization may be evacuated or an inert gaseous atmosphere, as, for instance, a nitrogen atmosphere, may be employed.

It will be understood by those skilled in the art that various plasticizers, modifying agents such as modifying resins, fillers, etc., as is conventional in this art, may also be incorporated in the compositions described above.

The above description and examples are intended to be illustrative only. Any modification of and variation therefrom which conforms to the spirit of the invention is intended to be included within the scope of the claims.

This application is a continuation-in-part of Serial No. 717,796 now United States Patent 2,548,685 issued April 10, 1951.

We claim:

1. As a composition of matter, a catalyzed photopolymerizable resinophor composition consisting essentially of an ethylenically unsaturated resinophor containing dispersed therein a minor proportion of a halogenated mono ketaldonyl having the formula:

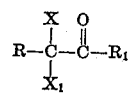

where R is selected from the group consisting of halogen atoms and monovalent hydrocarbon groups consisting solely of hydrogen and carbon atoms, X is a halogen atom, $X_1$ is selected from the group consisting of halogen atoms and hydrogen atoms, and $R_1$ is selected from the group consisting of hydrogen atoms and monovalent hydrocarbon groups consisting solely of hydrogen and carbon atoms.

2. As a composition of matter, a catalyzed photopolymerizable resinophor composition consisting essentially of an ethylenically unsaturated resinophor containing dispersed therein from about 0.1 per cent to about 5 per cent of a halogenated mono ketaldonyl having the formula:

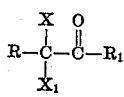

where R is selected from the group consisting of halogen atoms and monovalent hydrocarbon groups consisting solely of hydrogen and carbon atoms, X is a halogen atom, $X_1$ is selected from the group consisting of halogen atoms and hydrogen atoms, and $R_1$ is selected from the group consisting of hydrogen atoms and monovalent hydrocarbon groups consisting solely of hydrogen and carbon atoms.

3. As a composition of matter, a catalyzed photopolymerizable composition consisting essentially of an ethylenically unsaturated resinophor containing dispersed therein from 0.1 per cent to 5 per cent of desyl bromide.

4. As a composition of matter, a catalyzed photopolymerizable composition consisting essentially of an ethylenically unsaturated resinophor containing dispersed therein from 0.1 per cent to 5 per cent of desyl chloride.

5. As a composition of matter, a catalyzed photopolymerizable composition consisting essentially of an ethylenically unsaturated resinophor containing dispersed therein from 0.1 per cent to 5 per cent chloral.

6. As a composition of matter, a catalyzed photopolymerizable composition consisting essentially of an ethylenically unsaturated resinophor containing dispersed therein from 0.1 per cent to 5 per cent of bromal.

7. The method of photopolymerization which comprises adding to an ethylenically unsaturated photopolymerizable resinophor from about 0.1 per cent to about 5 per cent of a photopolymerization catalyst having the formula:

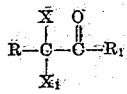

were R is selected from the group consisting of halogen atoms and monovalent hydrocarbon groups consisting solely of hydrogen and carbon atoms, X is a halogen atom, $X_1$ is selected from the group consisting of halogen atoms and hydrogen atoms, and $R_1$ is selected from the group consisting of hydrogen atoms and monovalent hydrocarbon groups consisting solely of hydrogen and carbon atoms, and irradiating the resulting mixture with actinic light to polymerize the resinophor.

8. The method of photopolymerization which comprises adding to an ethylenically unsaturated photopolymerizable resinophor from about 0.1 per cent to about 5 per cent of desyl bromide, and irradiating the resulting mixture with actinic light to polymerize the resinophor.

9. The method of photopolymerization which comprises adding to an ethylenically unsaturated photopolymerizable resinophor from about 0.1 per cent to about 5 per cent of desyl chloride, and irradiating the resulting mixture with actinic light to polymerize the resinophor.

10. The method of photopolymerization which comprises adding to an ethylenically unsaturated photopolymerizable resinophor from about 0.1 per cent to about 5 per cent of chloral, and irradiating the resulting mixture with actinic light to polymerize the resinophor.

11. The method of photopolymerization which comprises adding to an ethylenically unsaturated photopolymerizable resinophor from about 0.1 per cent to about 5 per cent of bromal, and irradiating the resulting mixture with actinic light to polymerize the resinophor.

CARROL C. SACHS.
JOHN BOND.

References Cited in the file of this patent
UNITED STATES PATENTS

| Number | Name | Date |
|---|---|---|
| 2,047,398 | Voss et al. | July 14, 1936 |
| 2,160,943 | Britton et al. | June 6, 1939 |
| 2,367,660 | Agre | Jan. 23, 1945 |
| 2,367,661 | Agre | Jan. 23, 1945 |
| 2,413,973 | Howk et al. | Jan. 7, 1947 |
| 2,448,828 | Renfrew | Sept. 7, 1948 |
| 2,548,685 | Sachs et al. | Apr. 10, 1951 |